Patented Feb. 16, 1943

2,310,973

UNITED STATES PATENT OFFICE 2,310,973

β-ALKYL-CINNAMIC ACID DERIVATIVES

William A. Lott, East Orange, N. J., assignor to E. R. Squibb & Sons, New York, N. Y., a corporation of New York No Drawing. Application August 27, 1938, Serial No. 227,060

3 Claims. (Cl. 260—477)

This invention relates to, and has for its object the provision of, certain acrylic acid derivatives.

The compounds embraced by this invention comprise bases of the general formula

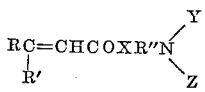

wherein R represents alkyl (especially lower alkyl), aryl (especially phenyl), or substituted aryl, R' represents alkyl (especially lower alkyl), R'' represents alkylene (especially lower alkylene) or substituted alkylene, X represents —O— or —NH—, and Y and Z represent alkyl (especially lower alkyl), or aralkyl; and the acid-addition salts thereof. These compounds are characterized by valuable local-anesthetic properties. They may be prepared by causing the appropriate acyl halide to react with the appropriate amino-alcohol and diamine—to form the ester or amide, respectively—or, those that are esters may be made by causing the alkali-metal salt of the appropriate acid to react with the appropriate amino-alkyl halide.

The following examples are illustrative of the invention:

EXAMPLE 1

β-diethylamino-ethyl p-methoxy-β-methyl-cinnamate hydrochloride

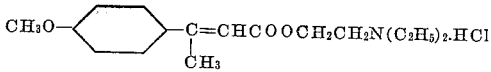

8.7 g. of p-methoxy-β-methyl-cinnamic acid dissolved in 125 cc. absolute ethanol is added to a solution of 2.1 g. sodium in 50 cc. absolute ethanol. To this mixture is added dropwise with stirring, 7.8 g. of β-diethylamino-ethyl chloride (hydrochloride) in 50 cc. absolute ethanol, and the whole is refluxed for 1.5 hours to complete the esterification. The alcoholic solution is then filtered, concentrated under reduced pressure, and mixed with ethyl ether and water. The ether layer is separated, dried over anhydrous sodium sulfate, and a slight excess of ethereal hydrogen chloride added. The resulting precipitate, the β-diethylamino-ethyl p-methoxy-β-methyl-cinnamate (hydrochloride), is recrystallized from acetone to a constant melting point of 126.5–127° C.

EXAMPLE 2

β-diethylamino-ethyl β-methyl-cinnamate hydrochloride

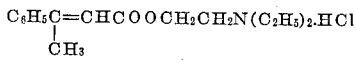

12 g. of β-methyl-cinnamic acid is dissolved in 50 cc. of absolute ethanol and added to a solution of 3.4 g. sodium in 50 cc. absolute ethanol. To the resulting suspension of the sodium salt of β-methyl-cinnamic acid is added a solution of 12.7 g. of β-diethylamino-ethyl chloride (hydrochloride) in 50 cc. absolute ethanol, and the reaction mixture is refluxed for six hours in a moisture-protected apparatus. After filtering off the precipitated sodium chloride, the alcohol solution is concentrated, and a very slight excess of anhydrous ethereal HCl is added. The crystalline product which separates is recrystallized from absolute ethanol, snow-white crystals melting at 141–142° C. being obtained.

EXAMPLE 3

β-diethylamino-ethyl β-propyl-cinnamate hydrochloride

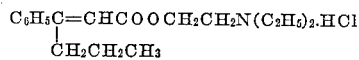

25 g. of thionyl chloride is added to 15 g. of β-propyl-cinnamic acid. The resulting solution is allowed to stand overnight, and the excess thionyl chloride removed by heating on the steam bath under a vacuum. The residue is distilled and redistilled, 14 g. of acid chloride being obtained (boiling at 150–155° C./10 mm.).

14.0 g. of β-propyl-cinnamyl-chloride is added to a solution of 5.9 g. of β-diethylamino-ethanol in 50 cc. absolute ethanol. The mixture is refluxed for two hours; after standing overnight, the precipitated product is removed by filtration. It may be purified by recrystallization from its aqueous solution containing an excess of hydrochloric acid, long needle-like crystals being obtained.

EXAMPLE 4

N-(β-diethylamino-ethyl)-p-methoxy-β-methyl cinnamide hydrochloride

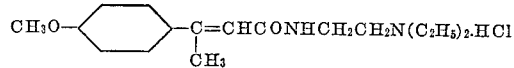

10 g. of p-methoxy-β-methyl cinnamic acid and 18.6 g. of thionyl chloride are heated together until a homogeneous reaction mixture is obtained, and the excess thionyl chloride is removed under reduced pressure by heating on a steam bath.

5 g. of the p-methoxy-β-methyl-cinnamyl chloride dissolved in 25 cc. of anhydrous benzene is added to 2.8 g. of β-diethyl-amino-ethylamine dissolved in 15 cc. of anhydrous benzene. The reaction mixture is refluxed for six hours, concentrated, and cooled to precipitate the product. The product may be purified by recrystallization from absolute alcohol.

Example 5

*β-diethylaminoethyl β-methyl-α-hexenate hydrochloride*

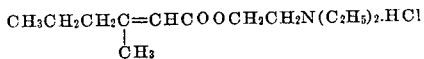

10 g. of β-methyl-α-hexenic acid dissolved in 100 cc. of absolute ethanol is added to a solution of 4.5 g. of sodium in 100 cc. absolute ethanol. To this mixture is added dropwise with stirring, 13.5 g. of β-diethylamino-ethyl chloride hydrochloride in 50 cc. of absolute ethanol, and the reaction mixture refluxed for two hours to complete the esterification. The alcoholic solution is filtered, concentrated under reduced pressure, and mixed with ethyl ether and water; the ether layer is separated, washed with water, and dried over anhydrous sodium sulfate. A slight excess of ethereal hydrogen chloride is added, and the resulting precipitate purified by recrystallization from a mixture of alcohol and ether.

The following are further exemplificative compounds which may be produced by substituting the appropriate reactants in the foregoing examples:

6. β-diethylamino-isopropyl o-methyl β-ethyl-cinnamate hydrochloride.
7. N-methyl-N-benzyl-β-amino-ethyl β-methyl-cinnamate hydrochloride.
8. N - (N - methyl - N - ethyl - gamma - amino-propyl) -β-propyl-cinnamide hydrochloride.
9. N - (β - diethylamino - ethyl) - o - hydroxy-β-methyl-cinnamide hydrochloride.
10. N - (gamma - dimethylamino - β - hydroxy-propyl) -β-ethyl-α-pentenamide hydrochloride.

The bases of this invention may be converted into acid-addition salts generally—inter alia the hydrochloride, sulfate, borate, nitrate, lactate, tartrate, citrate, phosphate and picrate—by methods well known in the art, e. g. by dissolving the base in ether or other suitable organic solvent, adding an equivalent quantity of the acid, and evaporating the solution until crystallization ensues or until completely dry.

The invention may be variously otherwise embodied, within the scope of the appended claims.

I claim:

1. Dialkylamino-alkyl β-alkyl-cinnamate hydrochlorides.
2. β-diethylamino-ethyl β-methyl cinnamate hydrochloride.
3. An acid-addition salt of a dialkylamino-alkyl β-alkyl-cinnamate.

WILLIAM A. LOTT.